(12) United States Patent
Colarelli, III et al.

(10) Patent No.: US 6,581,463 B1
(45) Date of Patent: Jun. 24, 2003

(54) WHEEL SHIM APPARATUS AND METHOD

(75) Inventors: Nicholas J. Colarelli, III, Creve Coeur, MO (US); David M. Scribner, St. Charles, MO (US)

(73) Assignee: Hunter Engineering Co., Bridgeton, MO (US)

( * ) Notice: Subject to any disclaimer, the term of this patent is extended or adjusted under 35 U.S.C. 154(b) by 0 days.

(21) Appl. No.: 09/648,013

(22) Filed: Aug. 25, 2000

(51) Int. Cl.[7] ............................................. G01M 1/16
(52) U.S. Cl. ....................................................... 73/460
(58) Field of Search ........................... 73/460, 461, 462, 73/468, 470

(56) References Cited

U.S. PATENT DOCUMENTS

| | | | |
|---|---|---|---|
| 3,630,077 A | 12/1971 | Boileau | 73/146 |
| 4,139,041 A | 2/1979 | Newton | 157/13 |
| 4,244,416 A | 1/1981 | Newton | 157/13 |
| 5,103,595 A | 4/1992 | Dale et al. | 51/165.71 |
| 5,365,786 A | 11/1994 | Douglas | 73/462 |
| 5,396,436 A | 3/1995 | Parker et al. | 364/508 |
| 5,447,064 A * | 9/1995 | Drechsler et al. | 73/462 |
| 5,526,686 A * | 6/1996 | Fuchs et al. | 73/462 |
| 5,587,528 A * | 12/1996 | Rothamel et al. | 73/462 |
| 5,739,428 A | 4/1998 | Bux | 73/146 |
| 5,915,274 A * | 6/1999 | Douglas | 73/462 |
| 5,959,204 A * | 9/1999 | Rothamel et al. | 73/462 |
| 6,244,108 B1 * | 6/2001 | McInnes et al. | 73/462 |

FOREIGN PATENT DOCUMENTS

WO   PCT/US87/03141   11/1987   ........... B29D/30/00

* cited by examiner

*Primary Examiner*—Richard A. Moller
(74) *Attorney, Agent, or Firm*—Thompson Coburn, LLP

(57) ABSTRACT

A method of matching a tire to a wheel rim of a wheel to compensate for wheel rim run-out and tire force variations includes the steps of mounting a bare wheel on a spindle of a balancer and measuring the rim run-out, said wheel rim having a bead seat, mounting a tire on the wheel to form a wheel/tire assembly, mounting the wheel/tire assembly on the spindle and measuring tire force variation, determining a desired change in wheel rim run-out to reduce the tire force variation, removing the tire from the wheel, adding a shim to the bead seat of the wheel rim, the shim being selected to correspond to the desired change in wheel rim run-out, and remounting the tire on the wheel. The wheel shim is preferably elongate and has a width sized to fit in the bead seat of the wheel rim, the thickness of the wheel shim being substantially less than the width of the wheel shim, and the length of the wheel shim being substantially greater than the width of the wheel shim. The wheel shim has a bottom surface adapted to be disposed in the bead seat and has a top surface adapted to be in contact with the bead of a tire to be mounted on the wheel.

20 Claims, 12 Drawing Sheets

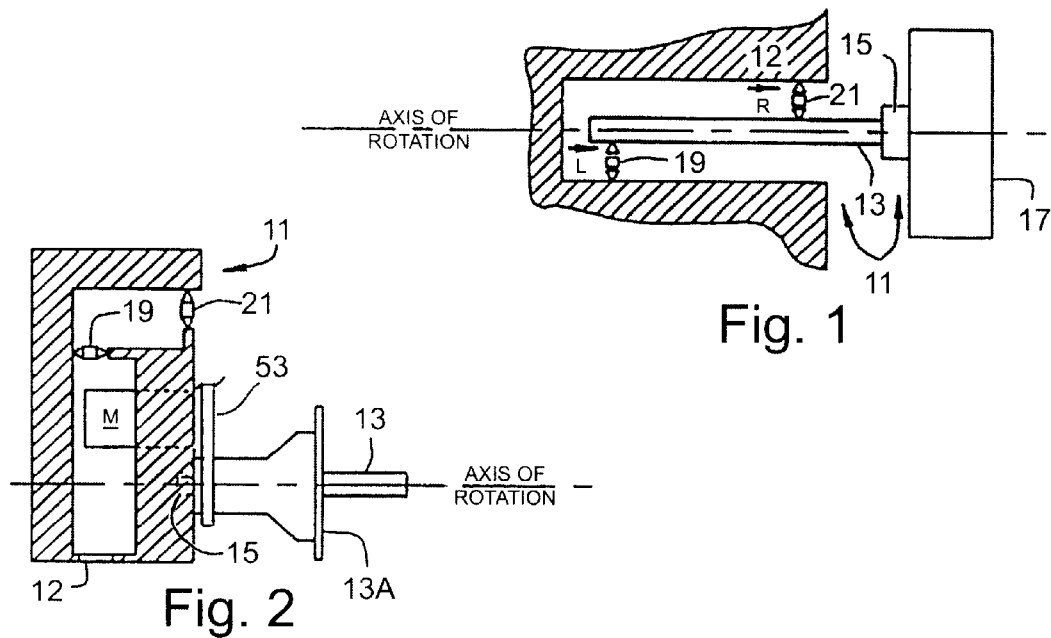
Fig. 1
Fig. 2
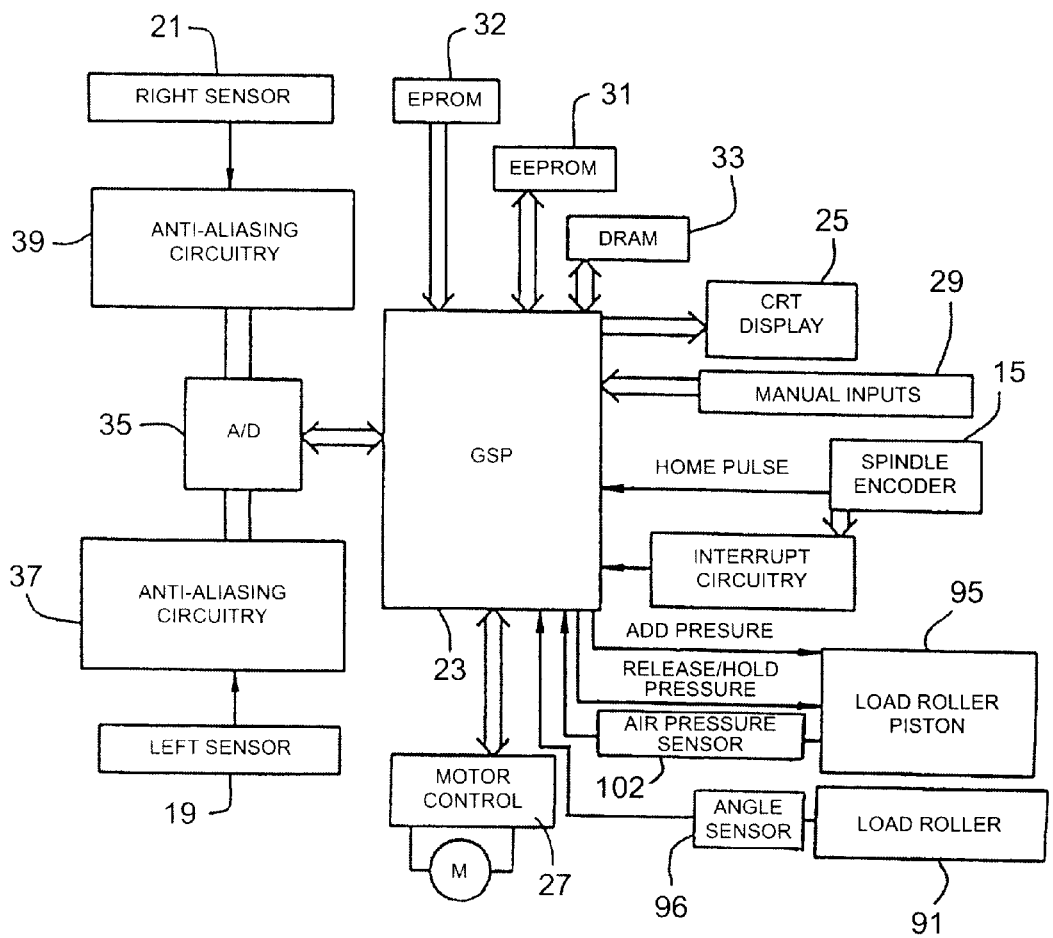
Fig. 3

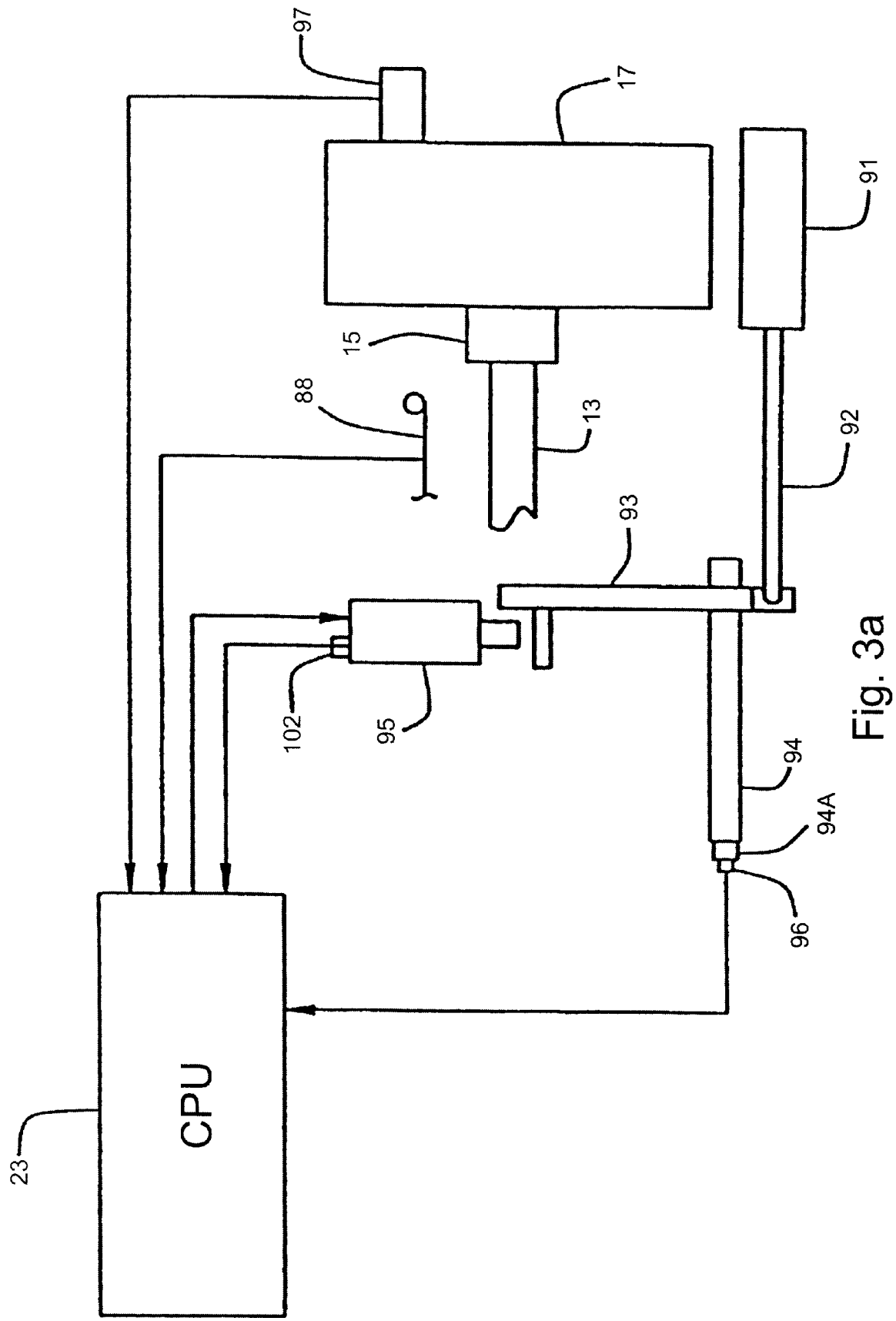

WHEEL SHIM APPARATUS AND METHOD

CROSS-REFERENCE TO RELATED APPLICATION

Not Applicable.

STATEMENT REGARDING FEDERALLY SPONSORED RESEARCH OR DEVELOPMENT

Not Applicable.

BACKGROUND OF THE INVENTION

1. Field of the Invention

This invention relates to matching tires to wheel rims and testing tires for acceptability, and more particularly to an improved system for improving tire acceptability.

2. Description of the Prior Art

Wheel balancers determine unbalance in vehicle wheel/tire assemblies by an analysis of the mechanical vibrations caused by rotating the wheel/tire assembly respectively. The mechanical vibrations are measured as motions, forces, or pressures by means of transducers, which convert the mechanical vibrations to electrical signals. Wheel/tire assembly unbalance may result from unbalance in the wheel, unbalance in the tire, or both.

Even when a wheel/tire assembly is balanced, non-uniformity in the construction of the tire as well as runout in the wheel rim can cause significant vibration forces as the wheel rolls under vehicle load. Most tire manufacturers inspect their tires on tire uniformity machines and grind rubber off the tires as required to improve rolling characteristics of the tires. Even after this procedure, tires will often produce vibration forces (not related to imbalance) of 20 pounds as they roll on a smooth road.

Despite improvement in balancing equipment over the years, it has been found that an unacceptably large number of tires are found to have excessive runout, even after matching the tire runout to that of available wheel rims.

Some of the deficiencies of prior art balancers are addressed by co-assigned U.S. application Ser. No. 09/311,473, which is incorporated herein by reference.

SUMMARY OF THE INVENTION

Among the various objects and features of the present invention the provision of method and apparatus which compensates for wheel rim and tire runout.

A second object is the provision of such a method and apparatus that increases the number of tires found to be acceptable after balancing.

A third object is the provision of such a method and apparatus which results in improved vibration reduction in the balanced wheel/tire assembly.

Other objects and features will be in part apparent and in part pointed out hereinafter.

Briefly, in a first aspect of the present invention a tire is matched to a wheel rim of a wheel to compensate for wheel rim run-out and tire force variations. The method of the invention includes mounting a bare wheel on a spindle of a balancer and measuring the rim run-out, said wheel rim having a bead seat, mounting a tire on the wheel to form a wheel/tire assembly, mounting the wheel/tire assembly on the spindle and measuring force variation of the wheel/tire assembly, determining a desired change in wheel rim run-out to reduce the wheel/tire assembly force variation, removing the tire from the wheel, adding a shim to the bead seat of the wheel rim, the shim being selected to correspond to the desired change in wheel rim run-out, and remounting the tire on the wheel.

In a second aspect of the present invention a wheel shim is provided for a wheel rim having a bead seat. The wheel shim is elongate and has a width sized to fit in the bead seat of the wheel rim. The thickness of the wheel shim is substantially less than the width of the wheel shim, and the length of the wheel shim is substantially greater than the width of the wheel shim. The wheel shim has a bottom surface adapted to be disposed in the bead seat and has a top surface adapted to be in contact with the bead of a tire to be mounted on the wheel.

BRIEF DESCRIPTION OF THE DRAWINGS

FIG. 1 is a diagrammatic view illustrating a generic wheel balancer suitable for use with the present invention;

FIG. 2 is a simplified top plan view illustrating a wheel balancer used in connection with the present invention;

FIGS. 3 and 3A are block diagram illustrating various parts of the wheel balancer of FIG. 1 or FIG. 2.

Similar reference characters indicate similar parts throughout the several views of the drawings.

DESCRIPTION OF THE PREFERRED EMBODIMENT

Figure 3B:
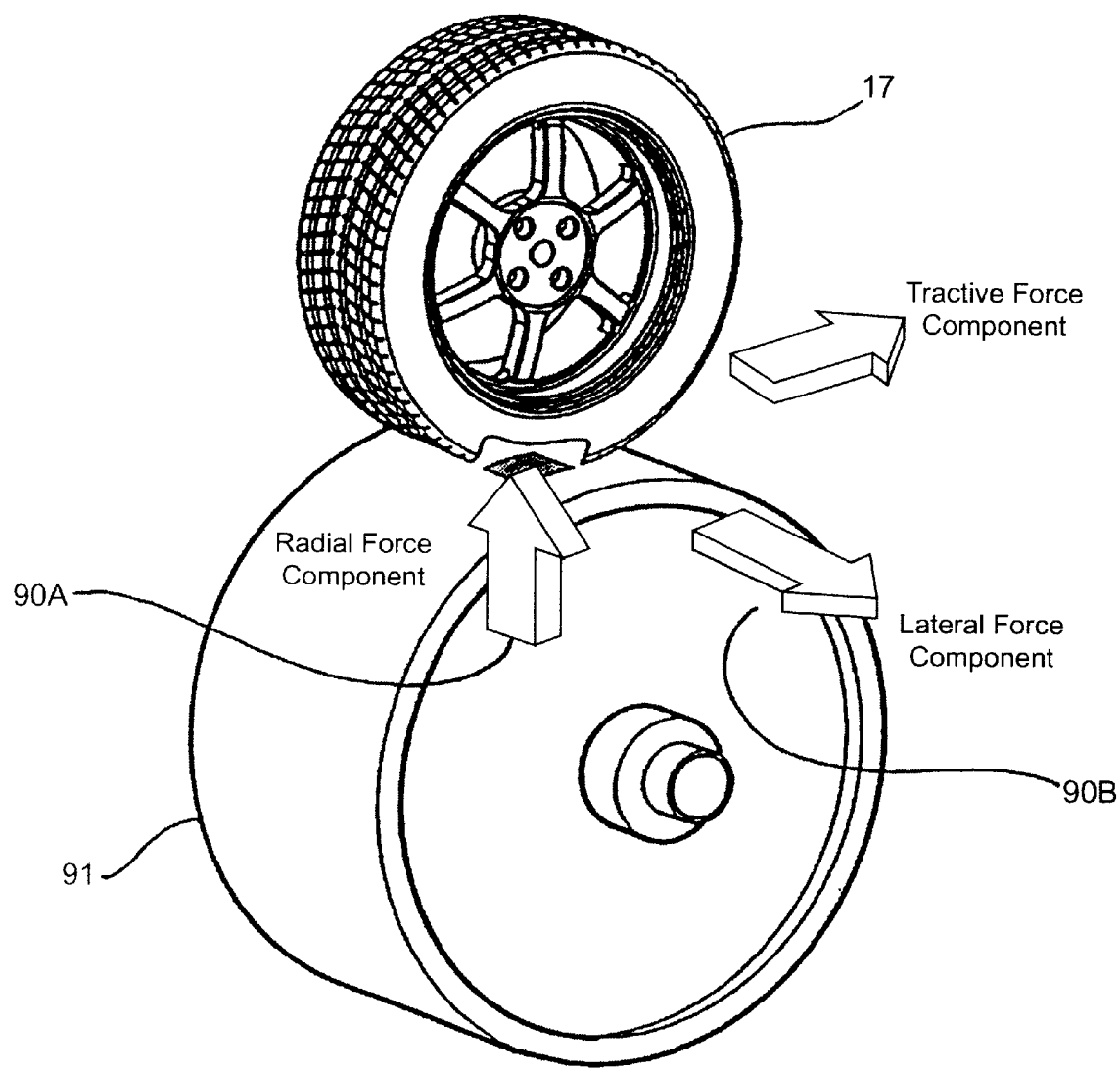
FIG. 3B is a graphic illustration of the contact forces imparted by the wheel balancer.

Turning to the drawings, FIG. 1 illustrates (in simplified form) the mechanical aspects of a wheel balancer 11 suitable for the present invention. The particular balancer shown is illustrative only, since the particular devices and structures used to obtain imbalance and runout information could readily be changed without changing the present invention.

Balancer 11 includes a rotatable shaft or spindle 13 driven by a suitable drive mechanism such as a motor M and drive belt 53 (FIG. 2). Mounted on spindle 13 is a conventional quadrature phase optical shaft encoder 15 which provides speed and rotational position information to the circuitry of FIG. 3.

During the operation of wheel balancing, at the end of spindle 13, a wheel/tire assembly 17 under test is removably mounted for rotation with spindle hub 13A (FIG. 2). To determine wheel/tire assembly imbalance, the balancer includes at least a pair of piezoelectric type imbalance force sensors 19 and 21 (or other suitable sensors such as strain gauges) coupled to spindle 13 and mounted on the balancer base 12. For ease of reference herein, sensor 19 is referred to as the "L" (Left) sensor and sensor 21 is referred to as the "R" (Right) sensor.

Turning to FIG. 2, it can be seen that the actual construction of the mechanical aspects of balancer 11 can take a variety of forms. For example, spindle 13 can include a hub 13A against which wheel/tire assembly 17 abuts during the balancing procedure.

When wheel/tire assembly 17 is unbalanced, it vibrates in a periodic manner as it is rotated, and these vibrations are transmitted to spindle 13. The "L" and "R" sensors are responsive to these vibrations of the spindle. Specifically, they generate a pair of analog electrical signals corresponding in phase and magnitude to the vibrations of the spindle at the particular transducer locations. These analog signals are input to the circuitry of FIG. 3, described below, which determines the required magnitudes and positions of correction weights to correct the imbalance.

Turning to FIG. 3, wheel balancer 11 includes not only the "L" and "R" sensors, and spindle encoder 15, but also a computer or CPU 23 (such as the graphic signal processing (GSP) chip 23 shown). GSP chip 23 performs signal processing on the output signals from the "L" and "R" sensors to determine wheel imbalance. In addition it is connected to and controls a display 25 which provides information to the user, controls motor M through motor control circuitry 27, and keeps track of the spindle position from encoder 15. More specifically, encoder 15 is a 128 count, two channel quadrature encoder which is fully decoded to 512 counts per wheel revolution by GSP chip 23. Although GSP chip 23 is shown, it should be understood that other controller circuitry could be used as well.

Balancer 11 also includes manual inputs 29 (such as a keyboard and parameter input data dials) which are also connected to GSP chip 23. Chip 23 has sufficient capacity to control via software all the operations of the balancer in addition to controlling the display. The GSP chip is connected to memory such as EEPROM memory 31, EPROM program memory 32, and dynamic RAM (DRAM) memory 33. The EEPROM memory is used to store non-volatile information, such as calibration data, while the GSP chip uses DRAM 33 for storing temporary data.

GSP chip 23 is also connected to an ADC 35. The signals from the "L" and "R" sensors 19 and 21 are supplied through anti-aliasing circuitry 37, 39 (if needed) to ADC 35.

The operation of the various components described above is fully described in U.S. Pat. Nos. 5,365,786 and 5,396,436, the disclosures of which are incorporated herein by reference. It should be understood that the above description is included for completeness only, and that various other circuits could be used instead. The GSP chip could be replaced by a general purpose microcontroller, for example, with no loss of efficiency in carrying out the present invention.

To understand the improvements of the present invention, it is helpful to examine some terms. FIG. 3B shows a tire 17 with a load roller 91 pressing against it, along with the three contact forces which are defined as radial 90A, lateral 90B and tractive 90C. Tire uniformity is a term which refers to a condition in which some property of a tire is not symmetric about its rotational axis. There are many uniformity parameters which can be quantified.

A value for the tire stiffness is required to convert wheel rim runout into radial force variation due to wheel rim runout: (wheel rim runout)(tire stiffness)=radial force variation due to wheel rim runout. Loaded radial runout of the wheel tire assembly can also be converted to a force variation value by using the tire stiffness or it can be measured directly as will be shown later. By subtracting the wheel force variation from the wheel/tire assembly force variation, the tire force variation can be obtained. By shifting the angle of the tire force variation relative to the wheel force variation, the wheel/tire assembly force variation can be computed at many remount angles of tire to wheel. Selecting the remount angle with the lowest wheel/tire assembly radial force variation is then possible.

The first harmonic of radial force variation is believed to be the best uniformity parameter to use to minimize wheel vibration because it also helps minimize the first harmonic tractive force variation.

Turning back to FIG. 3A, there is shown load roller 91 suitably disposed adjacent wheel/tire assembly 17 so that it may be forced into engagement with the tire so as to measure loaded runout of the assembly. More specifically, load roller 91 is carried on a shaft 92 suitably journaled on an L-shaped arm 93 designed to pivot about the axis of a shaft 94. CPU 23 causes the arm to pivot to place load roller into engagement with the tire by actuating an air cylinder 95 or an air bag actuator. Air pressure to cylinder 95 can be variably adjusted by CPU control. Air pressure feedback is provided by a sensor 102 such as those sold under the trade designation MPX 5700D by Motorola Inc. The feedback enables precise load roller forces to be generated and provides a unique safety feature in that the CPU can detect pressure problems and remove air pressure if needed. Rotation of shaft 94 (specifically rotation of a magnet 94A mounted on shaft 94) is sensed by a sensor 96 such as a Hall-effect sensor such as those sold under the trade designation 3506, 3507 or 3508 by Allegro Microsystems Inc. and the amount of rotation is signaled to the CPU.

By applying a known force to the tire with the load roller and watching the output of sensor 96, the CPU can determine the loaded runout of the wheel/tire assembly. CPU 23 uses the output of sensor 96 to measure the runout of wheel/tire assembly 17 under the predetermined load.

In addition, CPU 23 is preferably connected to suitable sensors 88 and 97 for measuring the axial and radial runout of the inside and outside wheel rims of assembly 17 at the bead seats. Various sensors suitable for the task are known. These outputs are radial and axial wheel rim runout signals. The first harmonic of radial wheel rim runout (both angle and magnitude) is determined by CPU 23 using a suitable procedure such as digital filtering or discrete Fourier transform (DFT). The same process can be performed to determine axial runout for each wheel rim. With both tire and wheel rim roundness measurements, CPU 23 is able to compare the measured values with stored wheel rim and tire runout specifications. When those specifications are not met, one can calculate a remounted orientation of the tire on the wheel rim that minimizes the total loaded runout. CPU 23 causes the display of such an orientation on display 25, along with the residual loaded runout which would remain after remounting. Alternatively, this information may be used to calculate the positions and amounts of required tire grinding to correct the loaded runout.

Figure 4:
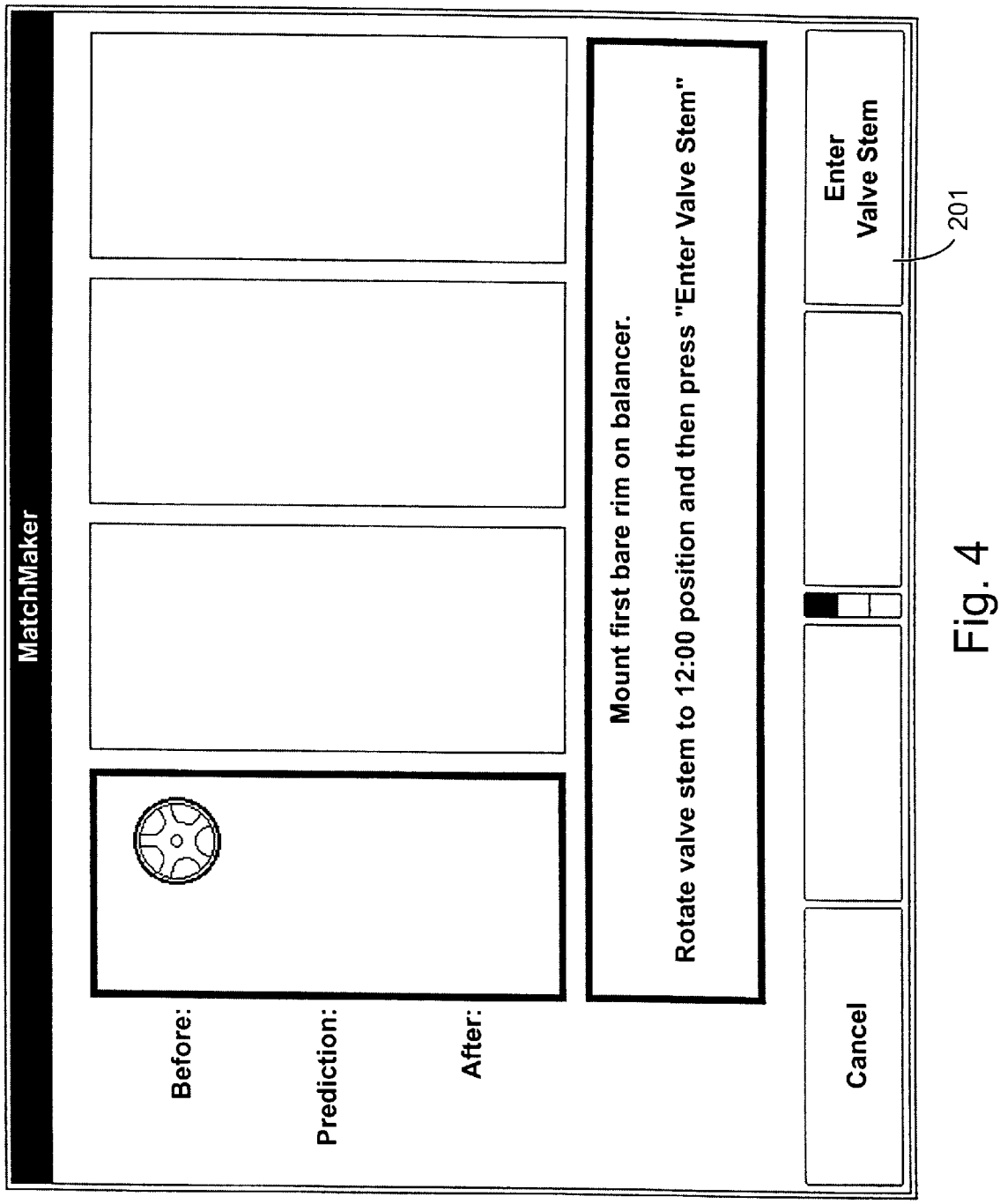
FIGS. 4–9 show various computer display screens for guiding a user through a procedure of this invention.

Runout arms 88 and 97, discussed above, may be advantageously used in improved tire matching and balancing. In this regard, the user signals to the CPU 23 the number of wheel/tire assemblies to be processed. Such a value can readily be provided to the CPU by an interactive screen display (not shown) in a conventional manner. Examples of typical numbers of wheel/tire assemblies are four (typical), five (four plus a spare), six ("duallies"—dual assemblies on the rear), etc. After selecting the desired number of wheel/ tire assemblies, the user is directed by a screen, such as that shown in FIG. 4, to mount a bare wheel on the spindle 13 of the balancer and to rotate the wheel so that the valve stem is disposed at the 12:00 position. The screen also directs the user to press a soft key 201 labeled "enter valve stem" when the valve stem reaches the 12:00 position. Pressing the soft key provides the CPU with the angular rotational position of the mounted wheel with respect to the spindle, which information is used in later steps where the wheel is re-mounted on the balancer. Using wheel rim runout measuring arm 88, the user then measures the "outside" wheel rim runout at the left rim lip. ("Left" in this context means that side of the rim which faces the vehicle when mounted on the vehicle and which faces the balancer during balancing. "Outside" has the meaning set forth above, namely that portion of the rim that will not be obscured by the tire once the tire is mounted thereon.)

Next, the user may optionally provide a centering check. This centering check is performed by loosening wing nut 101, rotating the wheel with respect to the spindle (preferably 180 degrees), and retightening the wing nut. The wheel is again rotated until the valve stem reaches the 12:00 position, at which point the user again presses the "enter valve stem" soft key 201 (which provides CPU 23 with the new angular position). Wheel rim runout measurement arm 88 is again used to measure the "outside" rim runout at the left rim lip. If the new measurement differs from the previous measurement by more than a preset amount (a predetermined threshold), the CPU causes a screen to be displayed which warns of the detected miscentering. If miscentering is detected, it is preferred that the procedure be restarted.

Figure 4A:
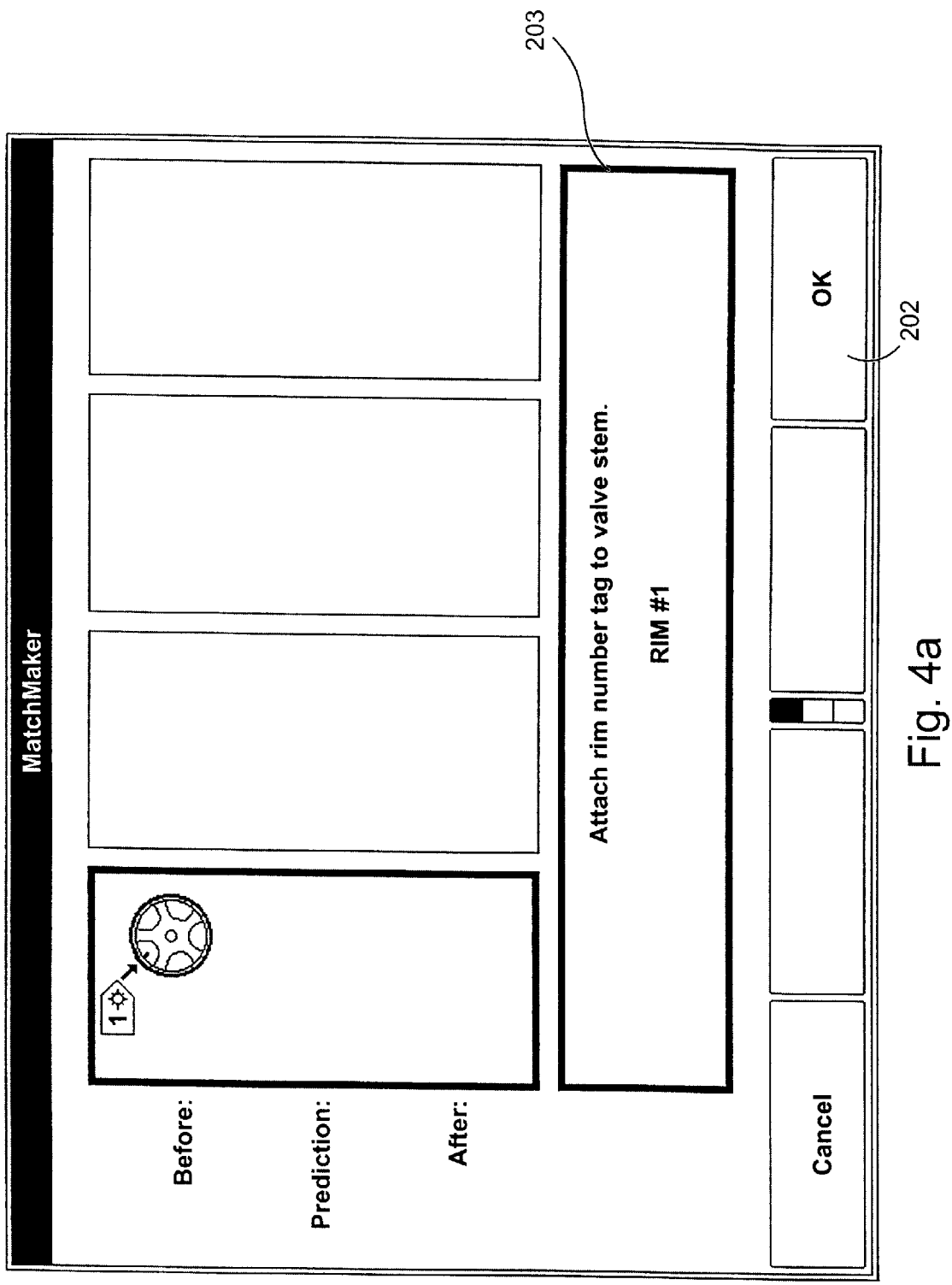

Next the wheel rim runout is measured at the bead seats using rim runout measuring arm 97. The CPU then causes the display of a screen, such as that shown in FIG. 4A, instructing the user to identify the wheel as wheel #1 by attaching a tag labelled "#1" to the valve stem of the first wheel and then to press soft key 202 labeled "OK". The screen provides a message 203 which provides directions, "Attach rim number tag to valve stem. RIM #1". At this point, wheel #1 is removed from the balancer and a tire is mounted thereon using a tire changer (not shown).

Once a tire is mounted to the wheel, the wheel/tire assembly is then mounted to the balancer, the user rotates the assembly until the valve stem reaches the 12:00 position, and then enters that fact via soft key 204. This act allows the CPU to determine the rotational position of the wheel/tire assembly with respect to the spindle.

At this point it is preferred that the "outside" wheel rim runout be measured at the left rim lip by wheel rim runout measurement arm 88. If this measurement reveals a centering problem, the CPU so instructs the user. Otherwise, the procedure is allowed to continue.

If there is no miscentering problem, the next step in the procedure is to spin the wheel/tire assembly to measure force variation and imbalance. The tire force variation is computed by removing from the measured wheel/tire assembly force variation a "compensated wheel rim runout" force variation contribution. The compensation includes any differences between the bead seat rim runout and the "outside" rim runout which were measured before tire mounting. This compensated rim runout is the runout that would be obtained from the bead seat method for the current wheel centering on the spindle of the balancer. Since the wheel/tire assembly force variation is also based on the current rim centering on the balancer, the highest accuracy tire force variation computation is achieved with this method.

Figure 5:
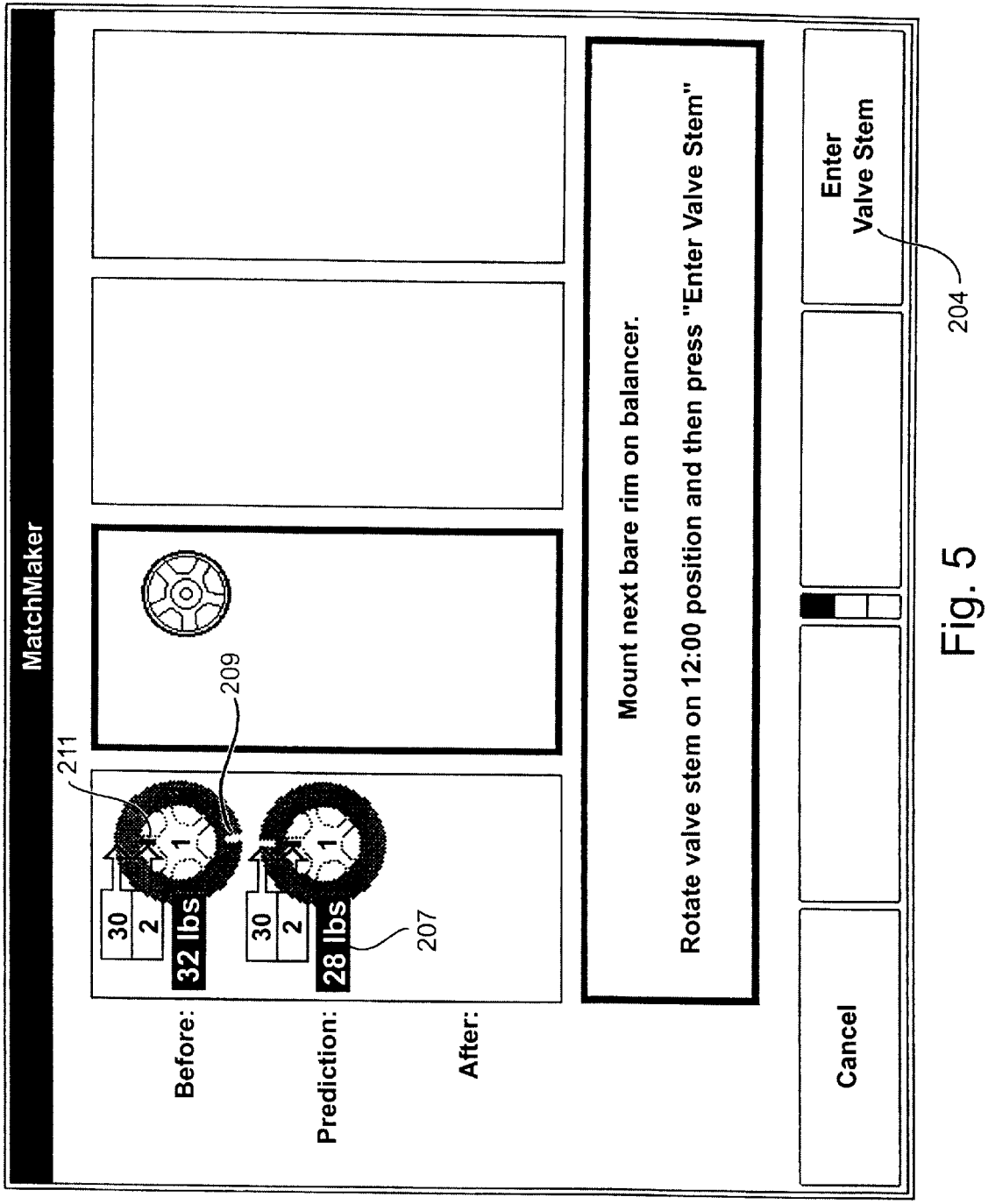
Figure 6A:
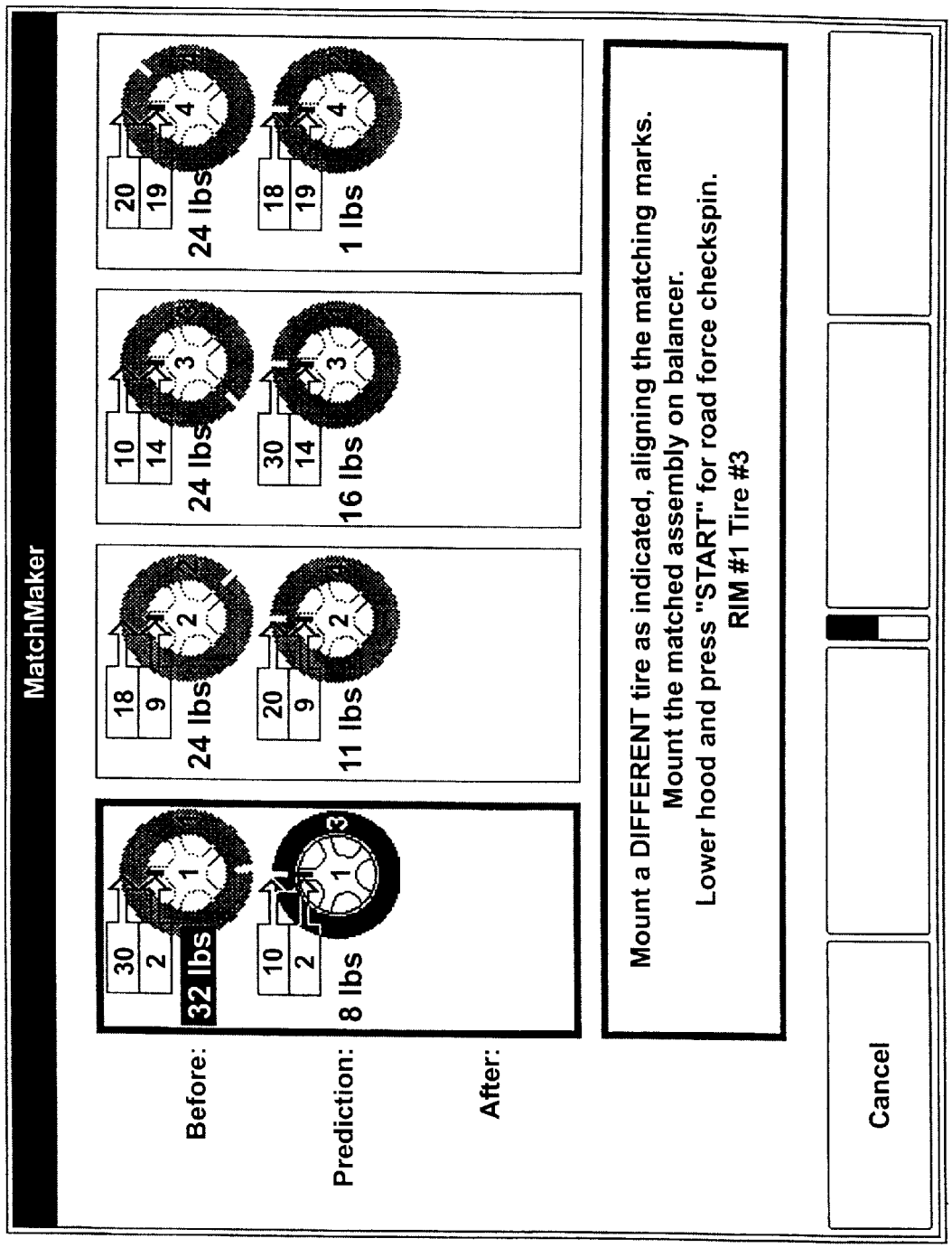

The tire force variation measurement of this assembly is automatically stored and displayed as reference tire #1 for later recall. The user is instructed via a screen (not shown) to mark the tire as "#1". Also, as shown in FIG. 5, the predicted matching result of rim #1 and tire #1 is displayed at 207. The user rotates the wheel/tire assembly to move the displayed tire matching mark 209 to the 12:00 position (as shown in FIG. 5). The user adds corresponding chalk marks (for example) to the tire when the correct position is reached. Then the user rotates the assembly again until the displayed wheel matching mark 211 is disposed at the 12:00 position. The wheel is suitably marked with this posit The assembly is removed from the balancer, but preferably no matching is attempted at this point in the procedure. Instead, the previous steps are repeated with another wheel and tire, with the components being marked with the next available number. As more assemblies are processed, the screen (see FIG. 6A) shows the best current match predictions for the available wheels and tires entered. For example, FIG. 6A shows the results at the fourth assembly force variation measurement step.

Figure 6B:
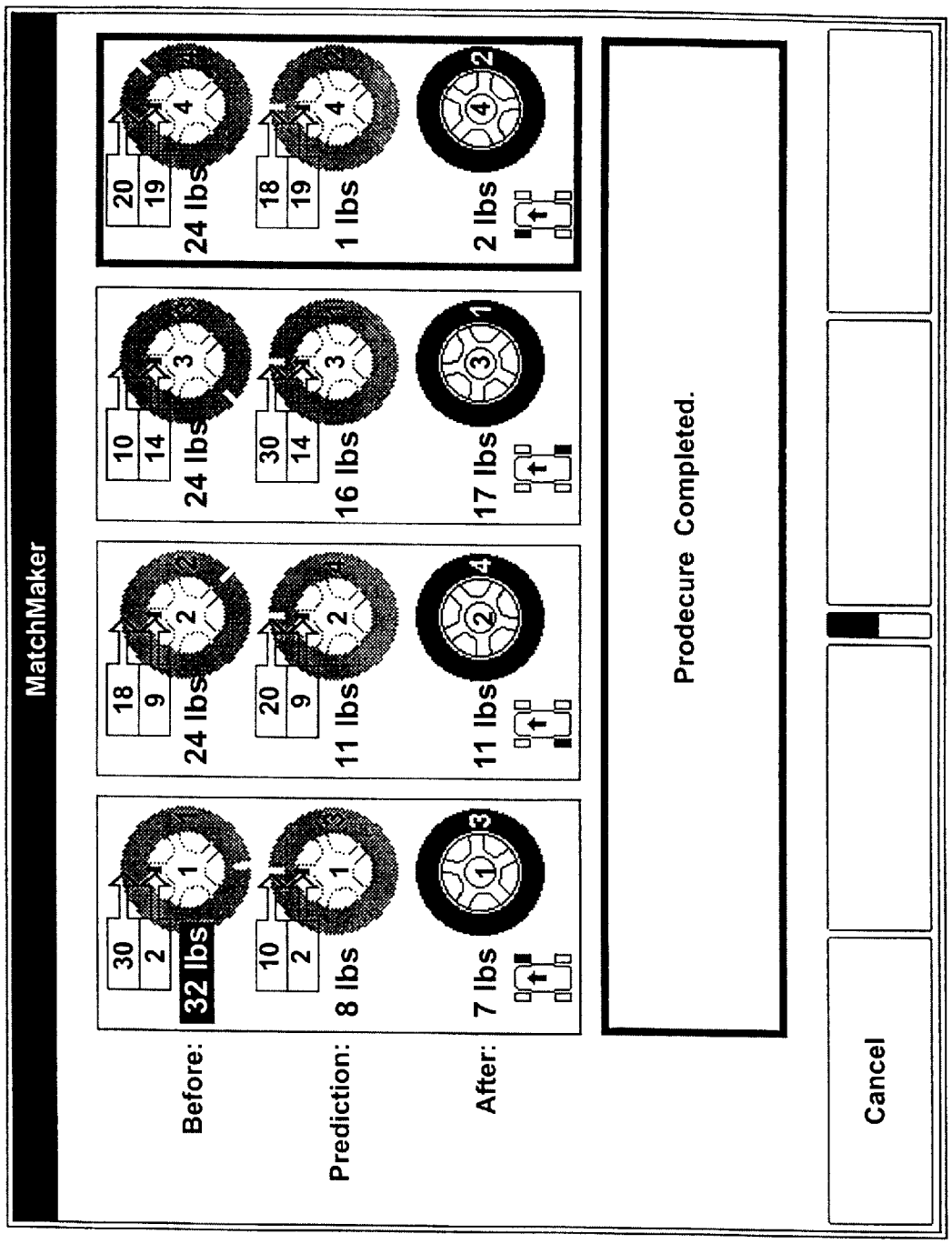
Figure 7:
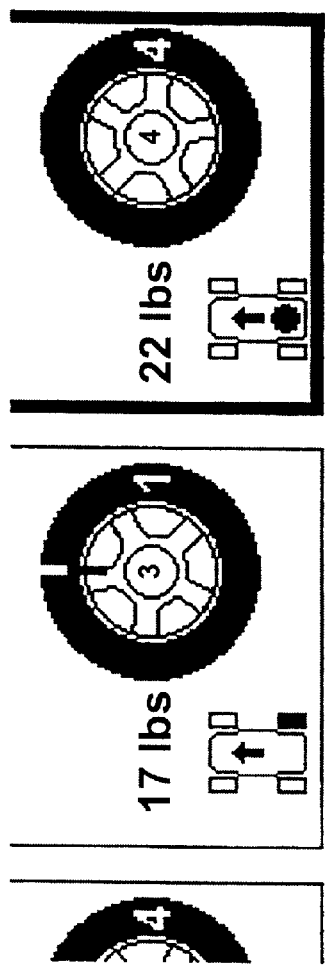

After all the assemblies are processed and the results are acceptable, matching is performed on them as illustrated on the screen. For example, FIG. 6A indicates that wheel #1 should be matched with tire #3, while tire #2 should be matched with wheel #4. If cross-matching is required, as with FIG. 6A, a printout of the matching instructions can be made for the user to carry to the tire changer. Preferably printouts are also made to record the imbalance and force variation for all assemblies (both original, and as matched) as shown on the screen illustrated in FIG. 6B.

After matching in accordance with the computer instructions, each numbered assembly is then balanced as guided by the screen.

Figure 8:
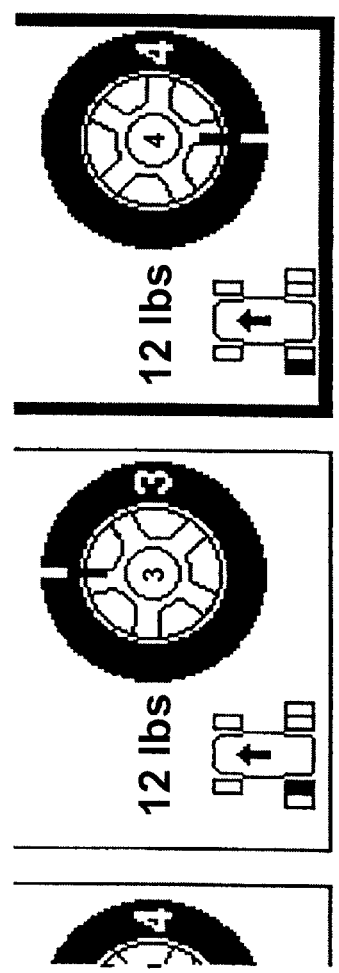

In matching, it is important to note that the tires are mounted to the respective wheels at the rotational locations indicated on the screen. Moreover, the assemblies are mounted on the vehicle at the recommended locations (as shown on FIG. 6B). In addition, the matching marks are shown on the screen of FIG. 6B at a recommended orientation for placing the assembly onto the vehicle stud patterns. These recommended orientations take advantage of gravity and looseness of the fit of the wheel center bores to the vehicle wheel pilots, which induces a small amount of assembly runout which can counteract residual force variation and/or residual imbalance. The worst assemblies are mounted on the rear of the vehicle (which is the least sensitive end for vibration), as the spare location (see FIG. 6B), or (optionally for "duallies") paired with another assembly with similar residual force variation but at opposing angular placement for net cancellation (see FIG. 8).

It should be understood that the method described above is directed by the CPU under program control, so that the balancer itself directs the performance of the method. It should also be understood that numerous options are available in performing the method. For example, at any time at measured tire can be "removed" from the procedure and replaced with a different tire. In this manner, the set of assemblies can be varied with the addition of different tires until a satisfactory result is achieved. Tires that are rejected for the particular wheels being tested can have match codes added to the angle mark discussed above and can then be re-inventoried for possible later use with other wheels.

It is also possible to provide a dual user function, so that matching being done by user A can be interrupted by a matching by user B, without interfering with the results obtained by user A.

It should also be appreciated that any time the left wheel rim lip is measured by arm 88 the outer arm 97 can also measure the runout of the right rim lip. This additional measurement provides more data for wheel remount centering compensation and error detection. This is especially important in cases where the wheel is mounted crooked, since the offset of most wheels causes the outer rim flange lateral and radial runout to be magnified compared to the inner runout change. Of course, one may prefer not to measure the right rim lip for various reasons, such as avoiding marring clearcoated aluminum wheels, or the fact that many wheels are "flat faced" or have spoke designs that prevent proper measurement of runout via the "outside" surfaces.

It should also be appreciated that the present invention does not require that the bare rim runout be determined prior to the runout of the wheel/tire assembly. For example, all four wheel/tire assemblies of a vehicle can be tested on the balancer, measuring only inner rim "outside runout" and assembly force variation. Each tire is then marked with a distinct number, corresponding to a number assigned to that wheel, with the mark being placed in line with the valve stem. Then, all four tires are dismounted, and the four bare wheels are sequentially mounted on the balancer (using the valve stem at 12:00 position as described above. The same runout measurements for the wheel rims are then obtained as described above, but in this option they are obtained last. Predictions are then made as in FIG. 6, with any required cross-matching shown. The tires are not remounted to the rims at this point, however. Instead the displayed matching marks for the tires are added to the rims with a "T" next to them. The user must lay the wheels on the tires, aligning the previous tire numbers to the valve stems for proper transfer of the "T" (tire) matching marks.

Another possible variation is to measure all common components at the same time. For instance, in the procedure described first above, it may not be desirable to measure a wheel rim, add a tire, measure the next wheel rim, etc. Rather, it may be preferred to measure all four wheels, then mount all four tires, and proceed with measuring the wheel/tire assemblies. This option could save time involved in walking back and forth to the tire changer.

Figure 9:
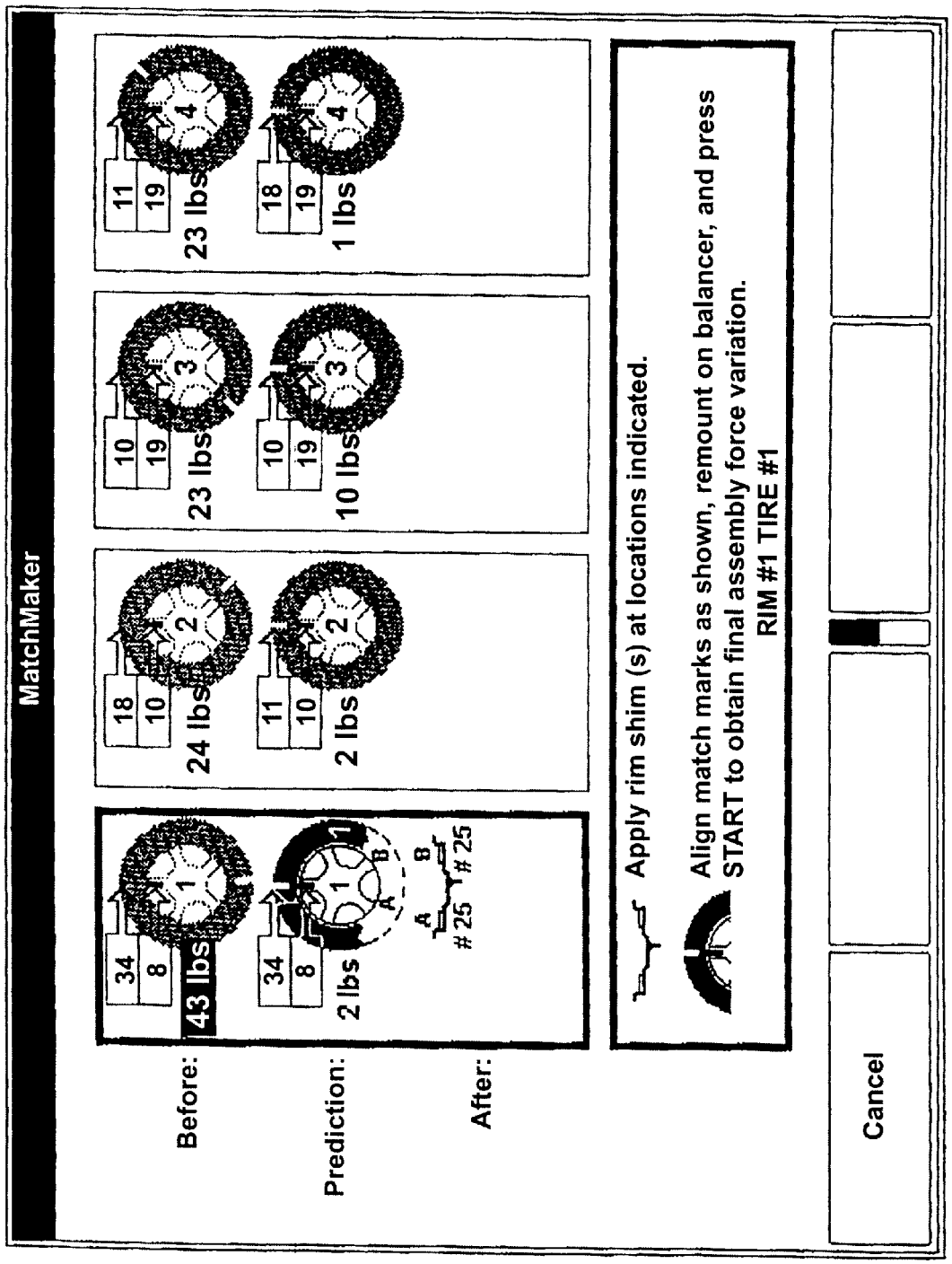

In addition to the variations discussed above, the present apparatus and method are particularly well suited for use in connection with wheel shims 221, described below. As shown in FIG. 9, the CPU can calculate from the runout and force variation data, the size and location of shims which can be added to the bead seat(s) of a wheel rim to compensate for runout. In FIG. 9, the CPU is instructing the user to add a #25 wheel shim to the left bead seat at the alignment mark, and to add another #25 wheel shim to the right bead seat at the alignment mark. Addition of these two wheel shims results in a substantial reduction of force variation and can result in making previously unacceptable tires acceptable.

In effect wheel shims 221 provide a desired change in wheel rim run-out to reduce the force variation. Since force variation can result from both wheel rim runout and tire runout, the wheel shim 221 can compensate for both conditions.

Figure 10:
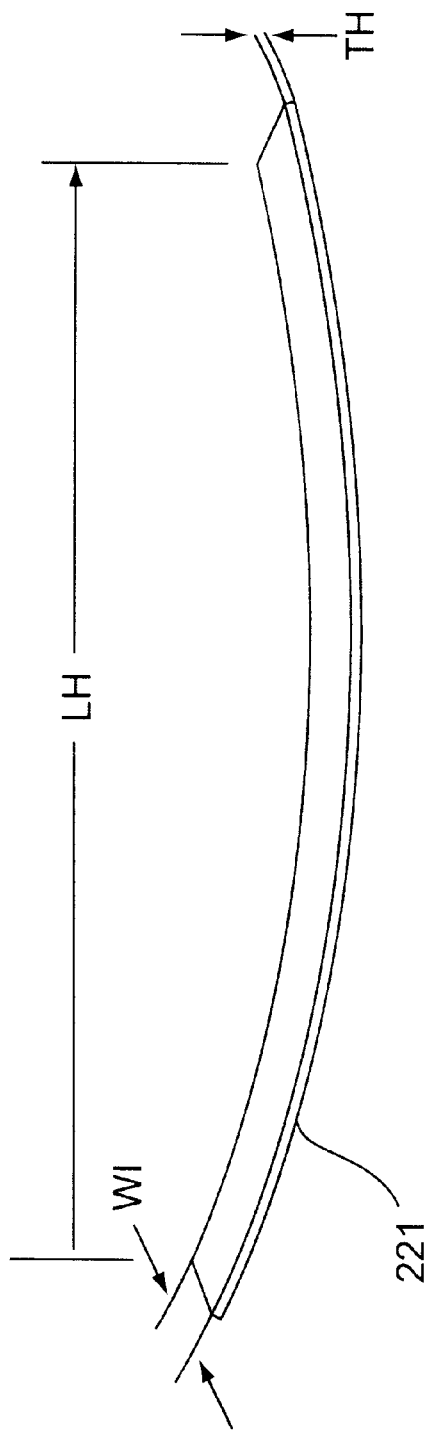
FIG. 10 is a perspective view of a wheel shim of the present invention.
Figure 10A:
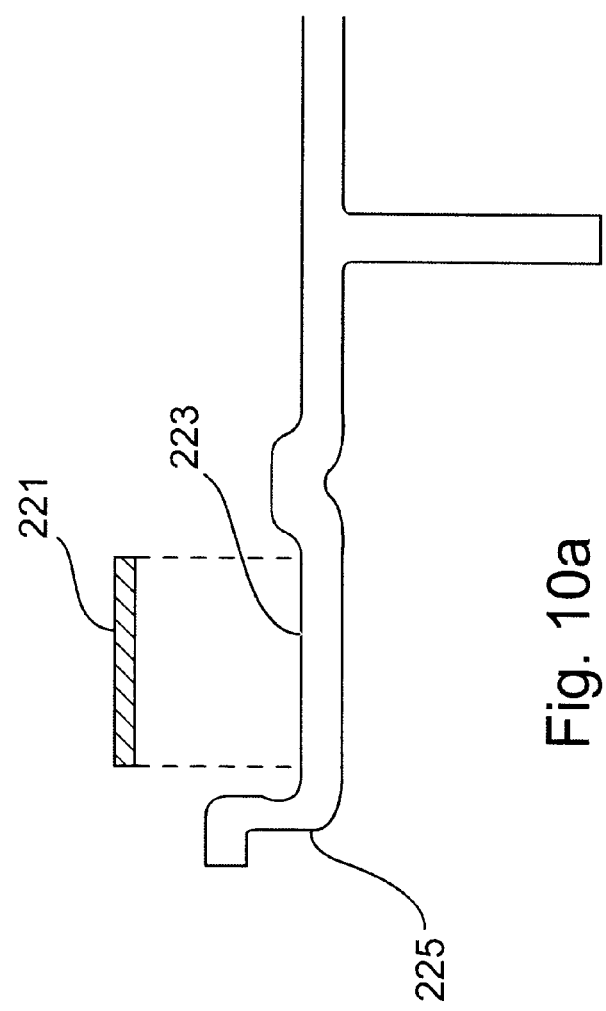
FIG. 10A is a cross-sectional view of the wheel shim of FIG. 10 prior to application a bead shim of a wheel rim.

Shims 221 are preferably available in several weights and thicknesses to compensate for different magnitudes of runout. Turning to FIGS. 10 and 10A, it can be seen that shims 221 are basically elongate, with a width sized to fit in the bead seat 223 of the wheel rim 225. The thickness "TH" of the wheel shim is substantially less than the width "WI" of the wheel shim 223, and the length "LH" of the wheel shim is substantially greater than the width. It is preferred that wheel shim 221 have a bottom surface adapted to be disposed in the bead seat and have a top surface adapted to be in contact with the bead of a tire to be mounted on the wheel rim.

Figure 11:
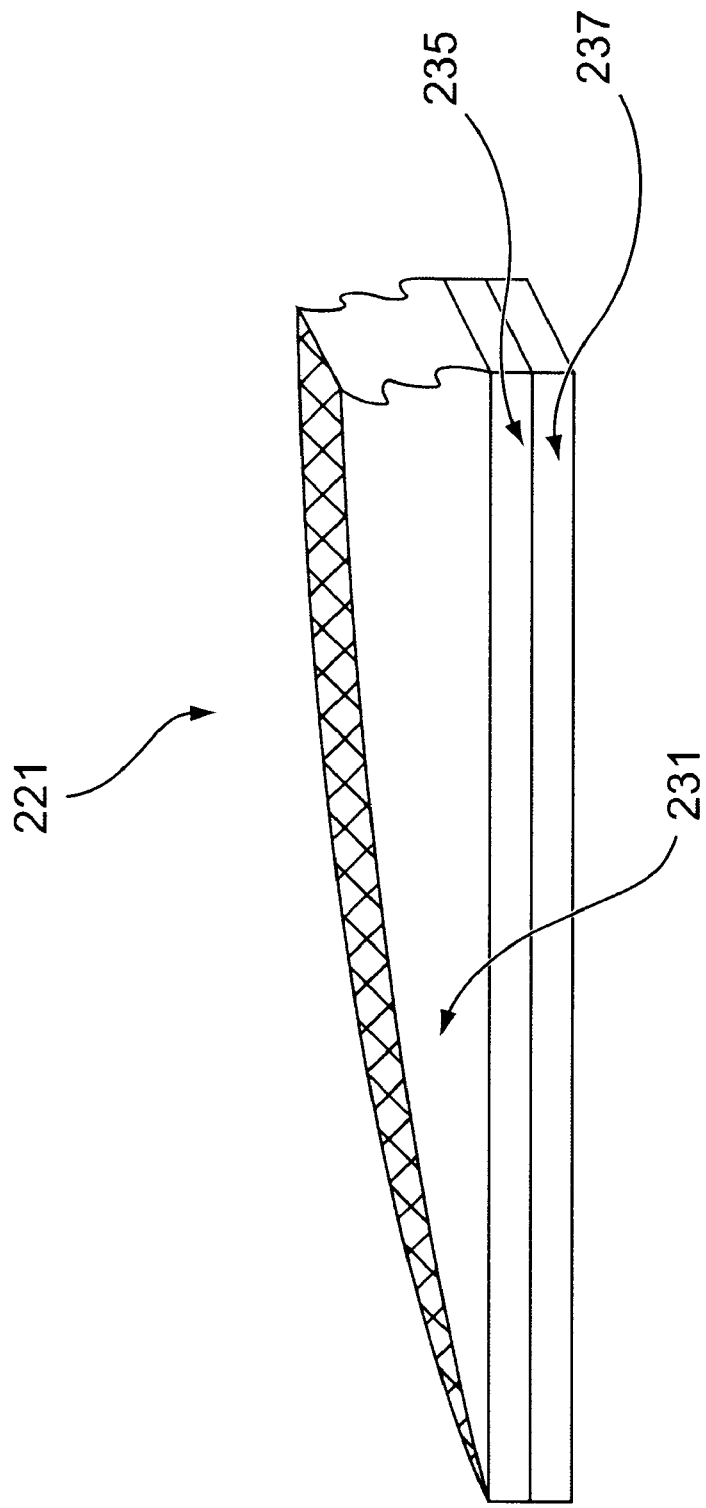
FIG. 11 is a perspective view showing one end of an embodiment of the wheel shim of the present invention.

Turning to FIG. 11, wheel shim 221 may be tapered on one or both ends, as indicated at 231, and may include a layer of adhesive 235 on its bottom surface (the adhesive preferably being of the peel-and-stick variety and, therefore, covered by a peel-off layer 237. It may also be preferred that the top of shim 221 include a knurled or similar surface to restraining the tire against movement with respect to the top of the wheel shim.

In view of the above, it will be seen that all the objects and features of the present invention are achieved, and other advantageous results obtained. The description of the invention contained herein is illustrative only, and is not intended in a limiting sense.

What is claimed is:

1. In a method of matching a tire to a wheel rim of a wheel to minimize wheel/tire assembly force variations, said wheel being referred to as a bare wheel prior to mounting the tire thereon, the improvement comprising:

mounting the bare wheel on a spindle of a balancer and measuring the rim run-out, said wheel rim having a bead seat;

mounting a tire on the wheel to form a wheel/tire assembly;

mounting the wheel/tire assembly on the spindle and measuring wheel/tire assembly force variation;

automatically determining a desired change in wheel rim run-out to reduce the wheel/tire assembly force variation;

removing the tire from the wheel;

adding a shim to the bead seat of the wheel rim, the shim being selected to correspond to the desired change in wheel rim run-out;

remounting the tire on the wheel.

2. The method as set forth in claim 1 wherein said automatic determining step further comprises the step of determining that the wheel rim has no substantial run-out and the force variation is due to the tire.

3. The method as set forth in claim 1 wherein said automatic determining step further comprises the step of determining the wheel shim that compensates for wheel rim run-out.

4. The method as set forth in claim 1 further including providing a plurality of shims, the determining step including determining which thicknesses of shims to be used in the shim adding step.

5. The method as set forth in claim 1 wherein said shim adding step further comprises the step of providing said wheel shim for the wheel rim, said provided wheel shim being elongate and having a width sized to fit in the bead seat of the wheel rim, the thickness of the wheel shim being substantially less than the width of the wheel shim, and the length of the wheel shim being substantially greater than the width of the wheel shim, the wheel shim having a bottom surface adapted to be disposed in the bead seat and having a top surface adapted to be in contact with the bead of a tire to be mounted on the wheel rim.

6. The method as set forth in claim 5 wherein at least one end of the wheel shim has a tapered thickness.

7. The method as set forth in claim 5 wherein the wheel shim includes a layer of adhesive on its bottom surface.

8. The method as set forth in claim 5 wherein the wheel shim includes means for restraining the tire against movement on its top surface.

9. A method of correcting the runout of a bare wheel comprising:

mounting the bare wheel on a spindle of a balancer and measuring the rim run-out, said bare wheel having a wheel rim with an external lip adjacent an interior bead seat;

determining a desired change in wheel rim run-out; and adding a shim to the bead seat of the wheel rim, the shim being selected to correspond to desired change in wheel rim run-out.

10. The method as set forth in claim 9 further including providing a plurality of shims, the determining step including determining which thicknesses of shims to be used in the shim adding step.

11. The method as set forth in claim 9 wherein a number of wheel rims have their rim run-out measured before a shim is added to the bead seat of at least one of the wheel rims.

12. A method of correcting the runout of a bare wheel comprising:

mounting the bare wheel on a spindle of a balancer and measuring the rim run-out, said bare wheel having a wheel rim with a bead seat;

determining a desired change in wheel rim run-out; and adding a shim to the bead seat of the wheel rim, the shim being selected to correspond to the desired change in wheel rim run-out;

said shim adding step further comprising the step of providing said wheel shim for the wheel rim, said provided wheel shim being elongate and having a width sized to fit in the bead seat of the wheel rim, the thickness of the wheel shim being substantially less than the width of the wheel shim, and the length of the wheel shim being substantially greater than the width of the wheel shim, the wheel shim having a bottom surface adapted to be disposed in the bead seat and having a top surface adapted to be in contact with the bead of a tire to be mounted on the wheel rim.

13. A method of correcting a tire assembly force variation of a tire/wheel assembly consisting of a wheel and a tire, said method comprising:

measuring the rim run-out of the wheel, the wheel having a wheel rim with an external lip adjacent a bead seat;

determining the tire assembly force variation;

determining a desired change in wheel rim run-out to minimize the tire assembly force variation; and adding a shim to the bead seat of the wheel rim, the shim being selected to correspond to the desired change in wheel rim run-out.

14. The method as set forth in claim 13 further including providing a plurality of shims, the determining step including determining which thickness of shims to be used in the shim adding step.

15. The method as set forth in claim 13 wherein a number of wheel rims have their rim run-out measured before a shim is added to the bead seat of at least one of the wheel rims.

16. A method of correcting a tire assembly force variation of a tire/wheel assembly consisting of a wheel and a tire, said method comprising:

measuring the rim run-out of the wheel, the wheel having a wheel rim with a bead seat;

determining the tire assembly force variation;

determining a desired change in wheel rim run-out to minimize the tire assembly force variation; and adding a shim to the bead seat of the wheel rim, the shim being selected to correspond to the desired change in wheel rim run-out;

said shim adding step further comprising the step of providing said wheel shim for the wheel rim, said provided wheel shim being elongate and having a width sized to fit in the bead seat of the wheel rim, the thickness of the wheel shim being substantially less than the width of the wheel shim, and the length of the wheel shim being substantially greater than the width of the wheel shim, the wheel shim having a bottom surface adapted to be disposed in the bead seat and having a top surface adapted to be in contact with the bead of a tire to be mounted on the wheel rim.

17. The method as set forth in claim 1, wherein said step for automatically determining said desired change in wheel rim run-out further comprises the step of determining a radial force variation due to the wheel rim run-out.

18. The method as set forth in claim 17, further comprising the step of subtracting said radial force variation from a wheel/tire assembly force variation to obtain a tire force variation.

19. The method as set forth in claim 1, further comprising the step of selecting a remount angle based on said computed wheel/tire assembly force variations.

20. The method as set forth in claim 1, wherein said step for mounting the wheel/tire assembly on the spindle and measuring wheel/tire assembly force variation further comprises the step of directly measuring the wheel/tire force variation.

\* \* \* \* \*